US008892273B1

(12) United States Patent
Raghu et al.

(10) Patent No.: US 8,892,273 B1
(45) Date of Patent: Nov. 18, 2014

(54) TRANSFER OF AVIATION INFORMATION USING A MACHINE-READABLE OPTICAL REPRESENTATION

(75) Inventors: Kaushik Raghu, Cedar Rapids, IA (US); Patrick J. Cosgrove, Cedar Rapids, IA (US); Richard G. Moore, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 16 days.

(21) Appl. No.: 13/360,315

(22) Filed: Jan. 27, 2012

(51) Int. Cl.
*G06F 7/06* (2006.01)
*G06K 7/10* (2006.01)

(52) U.S. Cl.
USPC .......................................... 701/3; 235/462.01

(58) Field of Classification Search
CPC ... G08G 5/0021; G08G 5/003; G08G 5/0043; G06K 7/14; G06K 7/10861; G06K 7/10871
USPC ......... 701/3, 24, 25, 33.2, 33.3, 33.4, 462.04, 701/462.11, 462.45, 462.46, 469, 470, 701/472.01, 472.02; 235/462.01, 462.04, 235/462.11, 462.45, 462.46, 469, 470, 235/472.01, 472.02
See application file for complete search history.

(56) References Cited

U.S. PATENT DOCUMENTS

| 2007/0083303 | A1* | 4/2007 | O'Sullivan et al. ............. 701/29 |
| 2010/0105329 | A1* | 4/2010 | Durand et al. ............... 455/41.2 |
| 2010/0282856 | A1* | 11/2010 | Bulan et al. ................... 235/494 |
| 2011/0024491 | A1* | 2/2011 | Jamali et al. .................. 235/375 |
| 2011/0210171 | A1* | 9/2011 | Brown et al. .................. 235/382 |
| 2012/0089518 | A1* | 4/2012 | Blonchek ........................ 705/50 |
| 2012/0290418 | A1* | 11/2012 | Itwaru .............................. 705/16 |
| 2012/0298737 | A1* | 11/2012 | Thakar et al. ................. 235/375 |

OTHER PUBLICATIONS

"Sizing Applications for 2D Barcode Symbols", White Paper, 2007, Intermec Technologies Corporation, 12 pages.
"The 2D Revolution", White Paper, 2007, Intermec Technologies Corporation, 7 pages.

* cited by examiner

*Primary Examiner* — Mary Cheung
*Assistant Examiner* — Rodney Butler
(74) *Attorney, Agent, or Firm* — Donna P. Suchy; Daniel M. Barbieri

(57) ABSTRACT

The present disclosure is directed to a method and system for providing and transferring aviation data. In one embodiment, a machine-readable optical representation of the aviation data may be generated and displayed onboard the aircraft. This machine-readable optical representation may be scanned/read using a handheld device, therefore allowing the data to be topically transferred to the handheld device. The handheld device may automatically populate any forms that the user would otherwise need to fill out manually. Additionally and/or alternatively, the handheld device may provide the aviation data to an off-aircraft device and/or personnel utilizing its own communication channel.

17 Claims, 4 Drawing Sheets

TRANSFER OF AVIATION INFORMATION USING A MACHINE-READABLE OPTICAL REPRESENTATION

TECHNICAL FIELD

The present disclosure relates generally to information systems, and more particularly to providing and transferring aviation information.

BACKGROUND

As modern aviation advances, the demand for providing and transferring various types of aviation data also increases. For instance, a user (e.g., pilot, flight attendant, mechanic or the like) may be required to enter a significant amount of data in to one or more avionics systems onboard the aircraft prior to the departure. This may include data such as flight plan, charts, weight and balance information, list of legs, weather data, performance data, as well as other data that may be related to the flight. During the flight, data may also be transferred such as updates to aircraft position, altitude, inside/outside air temperature and pressure, heading or the general aircraft health status. In addition, after finishing the flight, the user may also be required to transfer the trip/flight close-out data from the avionics system(s) to a paper-based or an electronic filing system. The close-out data may include data related to the actual flight plan, weather conditions encountered, fuel burnt, procedures performed, maintenance data, faults, incidents, pilot activities, duty cycles, snags, as well as other data that may be related to the completed flight.

Various methods may be utilized for transferring such aviation data. For example, a user may manually copy the data from/to a paper medium (e.g., a notepad or a printed form). While this method is commonly practiced, it is time consuming and prone to human error. To reduce the workload required of the user, the data may be communicated electronically. For instance, data may be copied from/to a device that can be connected to the avionics system onboard the aircraft via a communication port (e.g., a USB port or the like). However, such a device requires a communication port and specialized protocols, and therefore may not be compatible with all aircrafts. Furthermore, adding a communication port to an aircraft introduces additional cost, weight and complexity, and may also need to be certified.

Certain wireless communication protocols may also be utilized for entering and/or transferring such aviation data. For example, data-link services or onboard Wi-Fi routers may be utilized to facilitate such communications. However, they also require additional hardware, which add weight, consume power, and may need to be certified as well. Globally, the frequencies upon which wireless communications occur are not consistent from country to country, which requires the equipage to either be adjusted or turned off when the aircraft operates within that country. Furthermore, wireless communication protocols may introduce certain security concerns, and therefore require additional attention to address such concerns.

Current interface approaches, which tend to be hardware based, are also difficult, time consuming and costly to change leading to systems and interfaces that restrict the efficacy and ability to evolve and change processes and procedures leading to betterment of the aviation experience. Additionally, current interface approaches are difficult to secure and therefore present serious security and access authorization challenges such as hacking.

Therein lies a need for providing and transferring aviation information without the aforementioned shortcomings.

SUMMARY

The present disclosure is directed to a method for providing aviation data. The method may include obtaining a set of aviation data elements available on an aircraft; generating a machine-readable optical representation based on the set of aviation data elements obtained; and displaying the machine-readable optical representation on a display module onboard the aircraft.

Another embodiment of the present disclosure is directed to an apparatus for providing aviation data onboard an aircraft. The apparatus may include a data obtaining module, a processing module and a display module. The data obtaining module may obtain a set of aviation data elements available on the aircraft. The processing module may generating a machine-readable optical representation based on the set of aviation data elements obtained. The display module may display the machine-readable optical representation onboard the aircraft.

An optical image reader may be utilized to read the machine-readable optical representation, therefore facilitating optical transfer of the set of aviation data elements from the display module to the optical image reader. The optical image reader may automatically populate any forms that the user would otherwise need to fill out manually. Additionally and/or alternatively, the optical image reader may provide the aviation data to an off-aircraft device and/or personnel utilizing its own communication channel.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION

Reference will now be made in detail to exemplary embodiments of the disclosure, examples of which are illustrated in the accompanying drawings.

The present disclosure is directed to a method and system for providing and transferring aviation data. In one embodiment, a machine-readable optical representation (e.g., a two-dimensional barcode or the like) of the aviation data may be generated and displayed onboard the aircraft. This machine-readable optical representation may be scanned/read using a handheld device, therefore allowing the data to be topically transferred to the handheld device. The handheld device may automatically populate any forms that the user would otherwise need to fill out manually. Additionally and/or alternatively, the handheld device may provide the aviation data to an off-aircraft device and/or personnel utilizing its own communication channel, which may be different from the communication channels utilized by the aircraft.

Transferring the data optically reduces user workload and eliminates human errors that may occur in a manual process. In addition, transferring the data optically does not require any hardware change to the avionics systems on the aircraft. Such a data transfer technology does not require any radio transmitter/receiver, does not interfere with any onboard radio COM/NAV equipment, and does not introduce any security concerns (e.g., no risk of data theft using wireless radio scanners/sniffers). Furthermore, various types of devices may be utilized for scanning/reading the machine-readable optical representation (e.g., mobile phones, tablet computing devices and the like), and the method in accordance with the present disclosure may be utilized globally independent of region-based wireless frequency standards.

Figure 1:
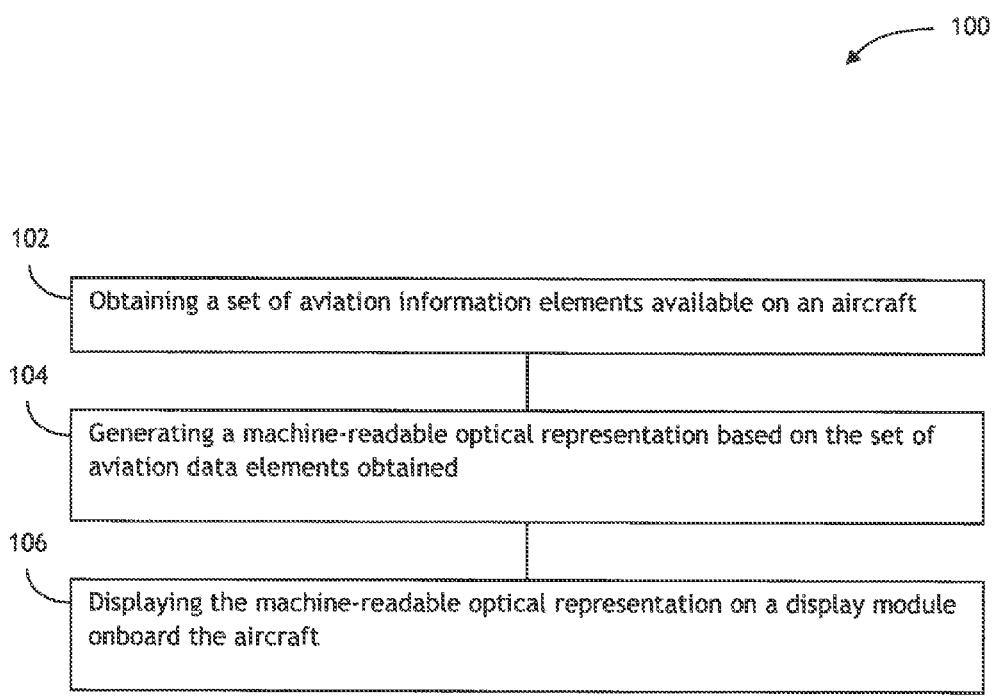
FIG. 1 is a flow diagram illustrating a method for providing aviation data onboard an aircraft.

Referring to FIG. 1, a method 100 for providing aviation data onboard an aircraft is shown. Step 102 may obtain a set of aviation data elements from one or more avionics systems on an aircraft. Step 104 may generate a machine-readable optical representation based on the set of aviation data elements obtained. This machine-readable optical representation may then be displayed on a display module onboard the aircraft (e.g., on the flight deck display or the like) in step 106.

In one embodiment, the method 100 may start upon receiving a command signal. The command signal may be a user-initiated command. Various types of input mechanisms may be utilized by the user to issue such a command. The input mechanisms may include touch-sensitive input devices, pointing devices (e.g., a mouse, a touchpad, a joystick, a trackball or the like) as well as other types of input mechanisms (e.g., a keyboard, a knob, a voice command receiver or the like). Additionally and/or alternatively, the method 100 may start upon receiving a system-generated command, which may be issued automatically upon certain predetermined events. For example, a system-generated command may be automatically issued when a predefined condition is achieved or detected. Such conditions may include, for instance, completion of the flight, wheels touching the ground, ground speed reaches a certain threshold, as well as various other conditions.

It is contemplated that the aviation data obtained in step 102 may include, but not limited to, aircraft data (e.g., aircraft type, registration information or the like), flight data (e.g., flight plan, start and end time or the like), fuel consumption data, weather data, maintenance data and any additional data that may be related to the flight. However, the specific set of data that needs to be obtained in step 102 may be predetermined and/or configurable without departing from the spirit and scope of the present disclosure.

It is also contemplated that various types of machine-readable optical representations may be generated to represent the aviation data obtained. For instance, a two-dimensional barcode such as a QR code (abbreviated from Quick Response or Quick Reference code) may be generated to represent the aviation data. In addition, the two-dimensional barcode may also include color (instead of only black and white) to increase its information density. Furthermore, standard or customized encryption and/or error correction technologies may also be utilized to enhance the security and reliability of the barcode generated. It is understood, however, that utilizing a two-dimensional barcode to represent the aviation data is merely exemplary. Other types of machine-readable optical images may also be utilized to represent the aviation data obtained.

It is further contemplated that the display module utilized to display the machine-readable optical representation generated in step 104 may be implemented utilizing a single screen display. Alternatively, a multi-screen implementation may also be utilized without departing from the spirit and scope of the present disclosure. In either implementation, the display module may display the machine-readable optical image so that the image can be scanned/read by an optical image reader. It is understood that an existing display device onboard the aircraft may be configured to display the machine-readable optical image and therefore no additional hardware is required.

Figure 2:
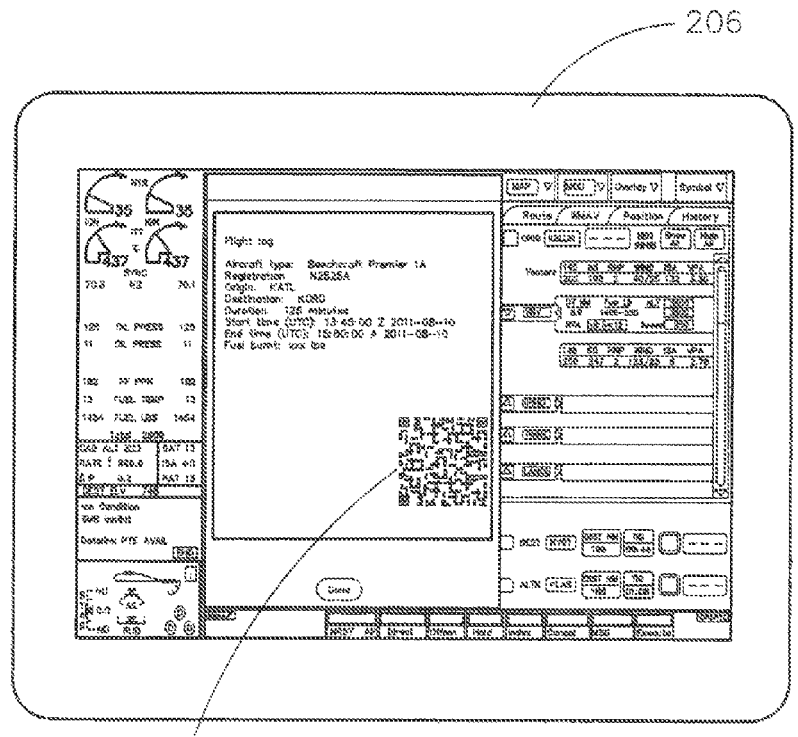
FIG. 2 is an illustration depicting a display module configured for displaying a machine-readable optical representation of the aviation data.
Figure 3:
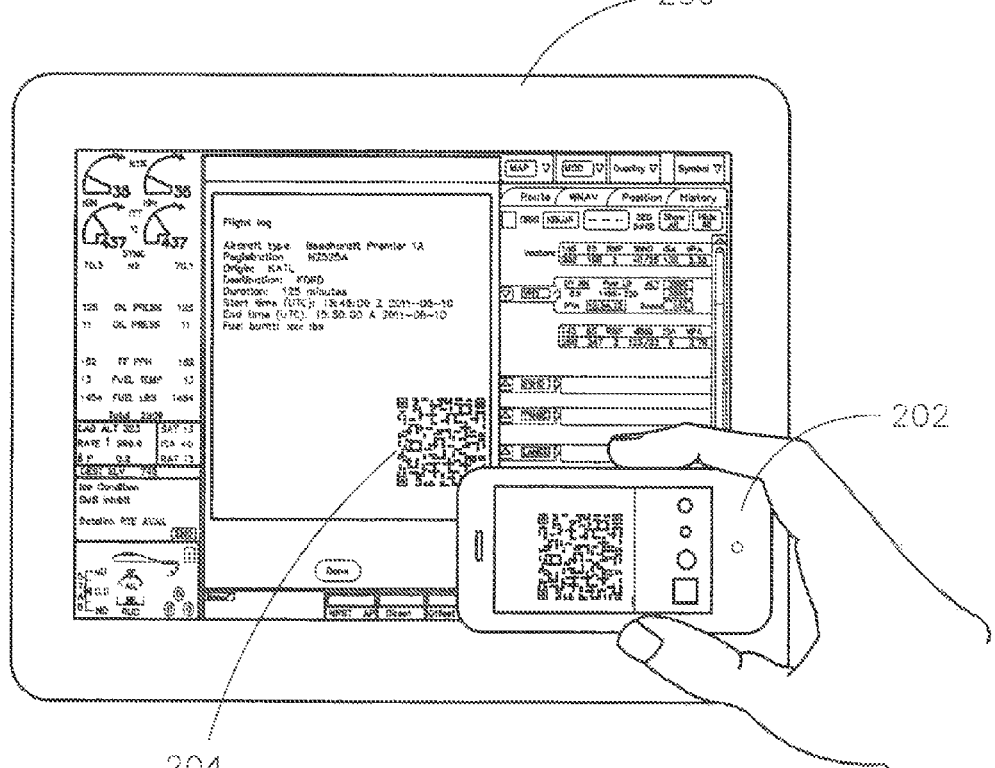
FIG. 3 is an illustration depicting utilizing an optical image reader to scan/read the machine-readable optical representation displayed on the display module.
Figure 4:
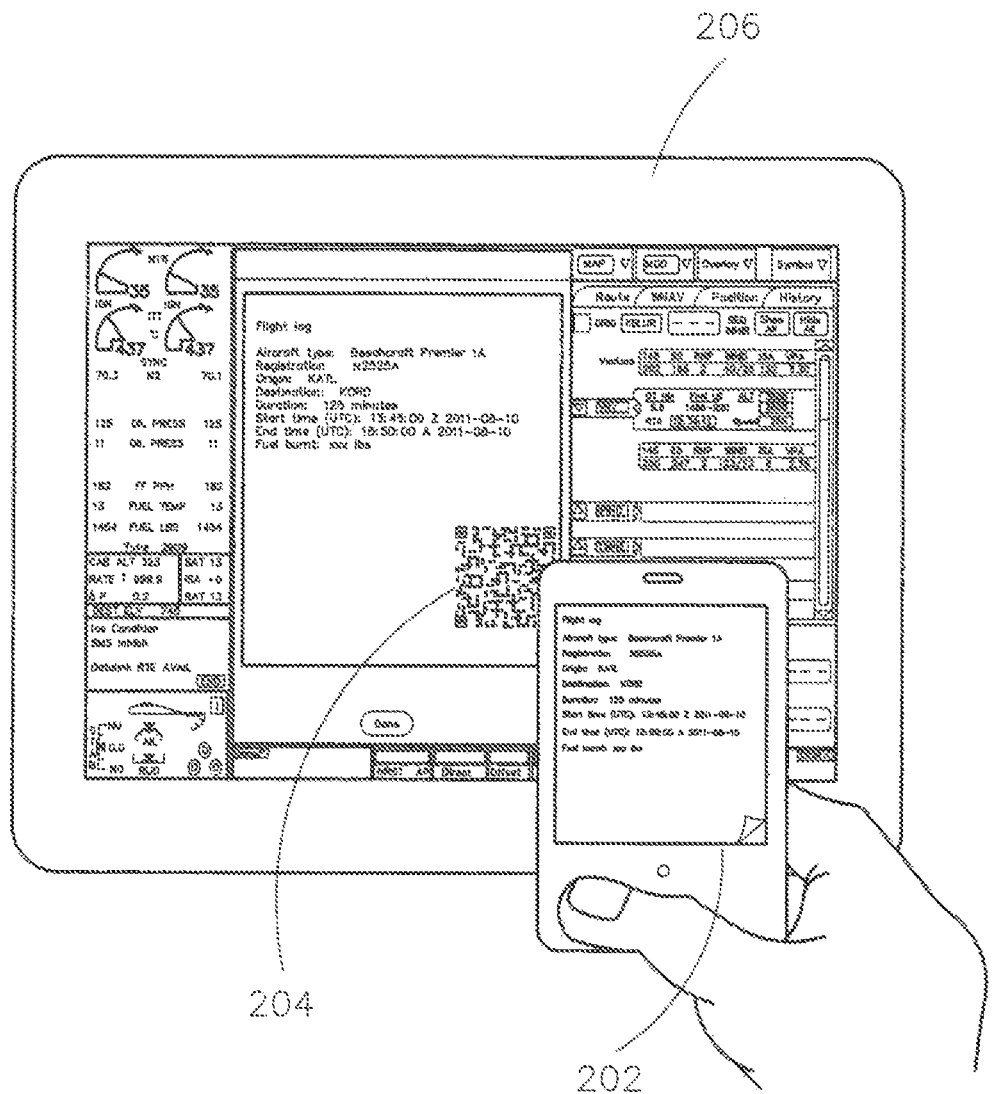
FIG. 4 is an illustration depicting a confirmation upon scanning/reading the machine-readable optical representation.

Referring generally to FIGS. 2 through 4, illustrations depicting using an optical image reader 202 to scan/read a QR code 204 displayed on a display module 206 are shown. As illustrated in FIG. 2, the display module 206 may display the aviation data about a recently completed flight. The aviation data displayed may include, for example, aircraft type and registration, departure and arrival airport codes and times, time of flight and amount of fuel burned. The display module 206 may also display the QR code 204 that carries the same information above but in a machine-readable optical representation.

FIG. 3 depicts a user (e.g., the pilot) capturing the QR code 204 using the optical image reader 202. The optical image reader 202 may include an imaging device capable of reading the QR code 204, such as a pen-type reader, a laser scanner, a camera-based reader or the like. The optical image reader 202 may also include a processor capable of decoding/interpreting the QR code 204 to obtain the aviation data that is represented by the QR code 204. In this manner, the aviation data displayed on the display module 206 can be transferred optically to the optical image reader 202. An exemplary optical image reader 202 may be a mobile or handheld device (e.g., a dedicated purpose device, a mobile phone, a tablet computing device or the like) equipped with a camera.

Once the aviation data is obtained by the optical image reader 202, as illustrated in FIG. 4, the optical image reader 202 may display the aviation data in a human readable format (e.g., in a textual format) for the user to confirm. This may allow the user to confirm the correctness of the aviation data optically transferred to the optical image reader 202. However, it is understood that providing the textual format for user confirmation is optional (on the optical image reader 202 and/or the display module 206), and the user may choose whether or not to review the aviation data in a textual format based on his or her preference. Furthermore, if error correction is provided in the QR code 204, the confirmation may be performed automatically.

The aviation data obtained by the optical image reader 202 may be utilized for various purposes and may therefore reduce the workload of the user. For instance, it may be used to complete and close out the pilot's flight plan, complete the pilot's flight log, or automatically populate any forms that a user would otherwise need to fill out manually. Additionally and/or alternatively, the optical image reader 202 may relay the aviation data to off-aircraft devices/personnel or other data consumers such as a file printer, a flight operations department database or other devices/applications. It is contemplated that the optical image reader 202 may utilize its own communication channel (which may be different from the communication channels utilized by the aircraft) to relay such data, therefore not consuming any resources and does not require any hardware support from the aircraft.

While the example above describes utilizing the method 100 to assist the user upon completion of a flight, it is contemplated that the method 100 may be utilized at any time prior to, during or upon completion of the flight. It is further contemplated that the machine-readable optical representation in accordance with the present disclosure may be continuously displayed on the display module. For instance, the machine-readable optical representation may be periodically updated (or regenerated) to reflect any updates on the aviation data elements.

It is also contemplated that the machine-readable optical representation in accordance with the present disclosure is not limited to a static image. In one embodiment, the optical representation may include multiple optical patterns/images displayed in sequence one after the other. In this manner, the optical image reader may capture the sequence of images and therefore increase the amount of data that can be optically transferred. In addition, the machine-readable optical representation in accordance with the present disclosure is not limited to only black and white images. Gray-scale (in addition to only black and white) and/or color optical patterns/images may be utilized to increase information density. For instance, the optical image reader may be capable of reading/detecting a high degree of contrast and variability of the colors and shades thereby used to convey a larger set of information. Such configurations reduce data-transfer time and improve operational efficiency.

Furthermore, different colors may be utilized to indicate different categories of data. This allows quick and selective extraction of data by different operators. For example, an optical image that represents data for a pilot log may be displayed in a different color than an optical image that represents data for a maintenance log. Similarly, optical images that represent data for other categories of data (e.g., fault logs or the like) may also be associated with different colors. The optical image reader 202 may recognize the different colors and process the data according to the categories that are these different colors.

It is further contemplated that the machine-readable optical representation in accordance with the present disclosure may be encoded with a secure encryption key. In this manner, only authorized optical image readers may be able to decode the optical images, therefore offers additional protection and data-security.

Figure 5:
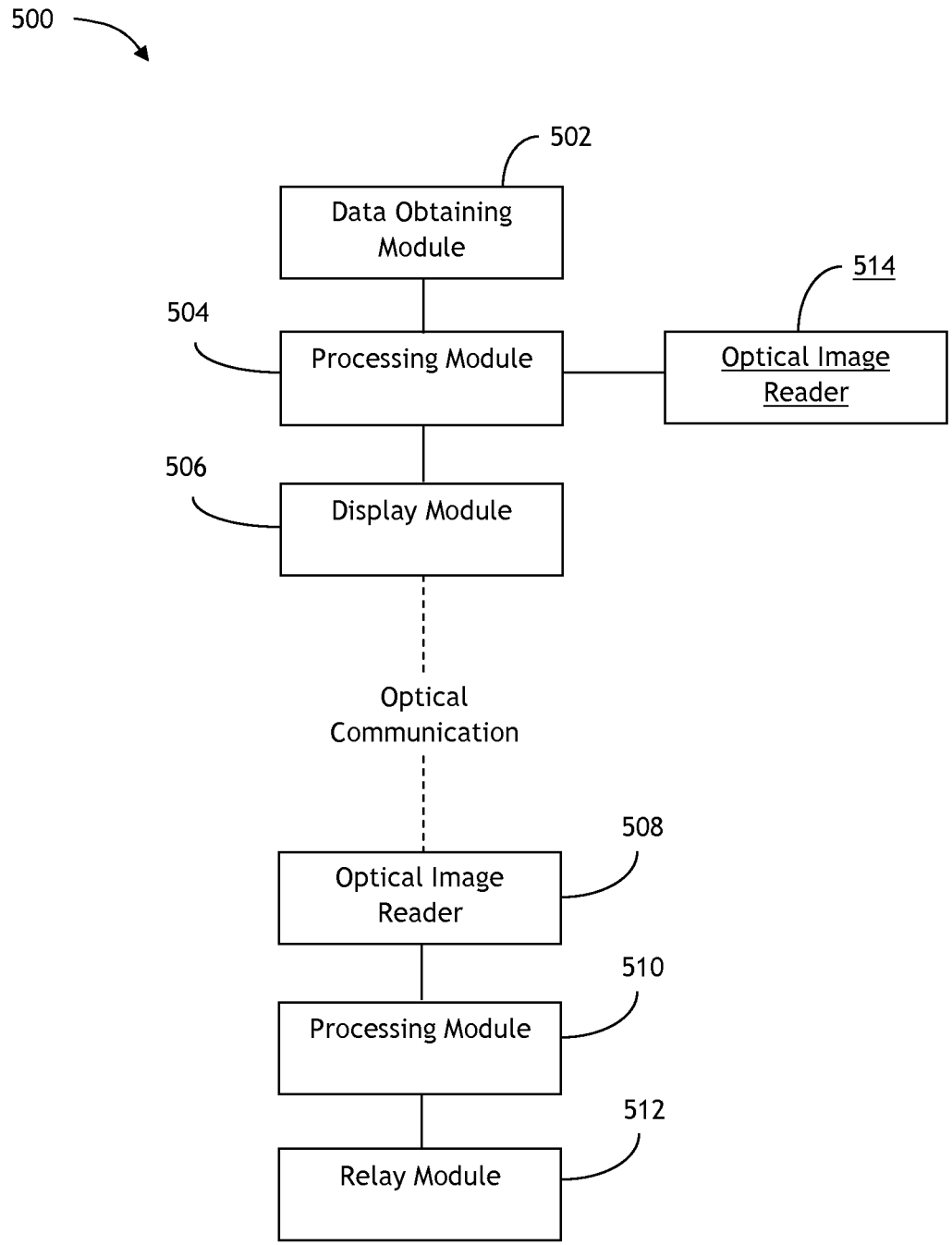
FIG. 5 is a block diagram depicting a system for providing and transferring aviation data in accordance with the present disclosure.

Referring to FIG. 5, a block diagram depicting a system 500 for providing and transferring aviation data is shown. The system 500 includes a data obtaining module 502 configured for obtaining a set of aviation data elements from one or more avionics systems on an aircraft. The system 500 also includes a processing module 504 configured for generating a machine-readable optical image based on the set of aviation data elements obtained. For instance, the processing module 504 may contain an algorithm that can use a proprietary formula to convert the data to a machine-readable optical image. Alternatively, processing module 504 may use an industry standard algorithm such as ISO 18004 or the like to create such an optical image. The machine-readable optical image may then be displayed on a display module 506 of the system 500.

An optical image reader 508 may be utilized to scan/read the machine-readable optical image displayed on the display module 506. The optical image reader 508 may communicate with a processing module 510 to decode/interpret the optical image. As previously described, the aviation data obtained by the optical image reader 508 may be utilized for various purposes and may therefore reduce the workload of the user. Additionally, a relay module 512 may be utilized to relay the aviation data to off-aircraft devices/personnel or other data consumers such as a file printer, a flight operations department database or other devices/applications.

Furthermore, it is contemplated that optically transferring aviation data in accordance with the present disclosure is not limited to obtaining data from avionics system(s) onboard the aircraft. The user may also transfer aviation data to the avionics system(s) prior to the departure in a similar manner. For instance, the user may perform all the pre-flight activities on a handheld device. This may include creating a flight plan, selecting enroute waypoints, creating custom checklists and the like. The handheld device may then process the data and display a corresponding machine-readable optical representation on its screen. The aircraft may be equipped with an optical image reader 514 (e.g. flight deck equipped with a camera), which may allow the user to simply present the handheld device to the flight deck in order to optically transfer the pre-flight data to the avionics system(s) onboard the aircraft. Once the user confirms the correctness of the transferred data, the avionics system(s) may then be set-up for the flight plan, thus eliminating the need for the user to manually enter data via flight deck controls.

The optical image reader 514 on the aircraft may also provide user identity management. For example, handheld devices are typically operator-specific. That is, each user (e.g., pilot) may have his or her own handheld device (e.g., mobile phone or the like). This allows the aircraft to identify and configure settings based on the identity of the optical pattern that is displayed on the user's own handheld device. This optical pattern/image may be utilized for various purposes, including presenting personalized settings, providing pilot authentication, enforcing access control or the like. Furthermore, optical data transfer in accordance with the present disclosure may also be utilized to improve data transfer between devices that are used without pilot intervention or involvement. Such devices may be utilized by various users including non-pilot crews, passengers, as well as machine-to-machine (i.e. automated) functions of the aircraft or the like.

It is to be understood that the present disclosure may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the present disclosure is not limited to any underlying implementing technology. The present disclosure may be implemented utilizing any combination of software and hardware technology. The present disclosure may be implemented using a variety of technologies without departing from the scope and spirit of the disclosure or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

It is believed that the present disclosure and many of its attendant advantages will be understood by the foregoing description, and it will be apparent that various changes may be made in the form, construction, and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. An apparatus for providing aviation data onboard an aircraft, the apparatus comprising:
   a processor configured for generating a machine-readable optical representation of a set of aviation data elements obtained on the aircraft; and
   a display device in communication with the processor, the display device configured for displaying the machine-readable optical representation onboard the aircraft, wherein the machine-readable optical representation includes a plurality of optical images, wherein each particular optical image is displayed in a color unique to the particular optical image among the plurality of optical images, wherein each unique color represents data of a particular aviation data category and wherein the plurality of optical images is sequentially displayed on the display device to accurately present the set of aviation of data elements for optical transmission.

2. The apparatus of claim 1, wherein the set of aviation data elements is obtained upon receiving at least one of: a user-initiated command or a system-generated command.

3. The apparatus of claim 1, wherein the set of aviation data elements comprises at least one of: aircraft data, flight data, fuel consumption data and maintenance data.

4. The apparatus of claim 1, wherein each particular optical image of the plurality of optical images includes a two-dimensional barcode, and wherein the two-dimensional barcode is displayed in the color unique to the particular optical image in its entirety.

5. An aviation information system, comprising:
   a processor processing module configured for generating at least one machine-readable optical image of a set of aviation data elements obtained on the aircraft;
   a display device configured for accurately displaying the at least one machine-readable optical image;
   an optical image reader configured for reading the at least one machine-readable optical image displayed on the display device, wherein the set of aviation data elements is optically transferred to the optical image reader utilizing the at least one machine-readable optical image; and
   a second optical image reader on board the aircraft, the second optical image reader configured for reading at least one machine-readable optical image which represents pre-flight data, the second optical image reader further configured for providing the pre-flight data to at least one avionics system onboard the aircraft.

6. The aviation information system of claim 5, wherein the optical image reader is further configured for:
   interpreting the at least one machine-readable optical image to obtain the set of aviation data elements.

7. The aviation information system of claim 6, wherein the optical image reader is further configured for:
   providing the set of aviation data elements to an off-aircraft device.

8. The aviation information system of claim 6, wherein the optical image reader is further configured for:
   displaying the set of aviation data elements in a human readable format for user confirmation.

9. The aviation information system of claim 7, wherein the optical image reader is in communication with the off-aircraft device via a separate communication channel different from any communication channels utilized by the aircraft.

10. The aviation information system of claim 5, wherein the set of aviation data elements comprises at least one of: aircraft data, flight data, fuel consumption data and maintenance data.

11. The aviation information system of claim 5, wherein the at least one machine-readable optical image includes a plurality of two-dimensional barcodes, wherein each particular two-dimensional barcode is displayed in a color unique to the particular two-dimensional barcode among the plurality of two-dimensional barcode, and wherein each unique color represents data of a particular aviation data category.

12. The aviation information system of claim 5, wherein in the set of aviation data elements is obtained upon receiving at least one of: a user-initiated command or a system-generated command.

13. A method for providing aviation data, the method comprising:
   obtaining a set of aviation data elements available on an aircraft; generating a machine-readable optical representation of the set of aviation data elements obtained; and
   utilizing a display device onboard the aircraft to display the machine-readable optical representation, wherein the machine-readable optical representation includes a plurality of optical images, wherein each particular optical image is displayed in a color unique to the particular optical image among the plurality of optical images, wherein each unique color represents data of a particular aviation data category, and wherein the plurality of optical images is sequentially displayed on the display device to accurately present the set of aviation of data elements for optical transmission.

14. The method of claim 13, wherein the step of obtaining the set of aviation data elements starts upon receiving at least one of: a user-initiated command or a system-generated command.

15. The method of claim 13, wherein the set of aviation data elements comprises at least one of: aircraft data, flight data, fuel consumption data and maintenance data.

16. The method of claim 13, wherein each particular optical image of the plurality of optical images includes a two-dimensional barcode, and wherein the two-dimensional barcode is displayed in the color unique to the particular optical image in its entirety.

17. The method of claim 13, further comprising:
   periodically updating the machine-readable optical representation displayed on the display onboard the aircraft.

* * * * *